Figure 1:
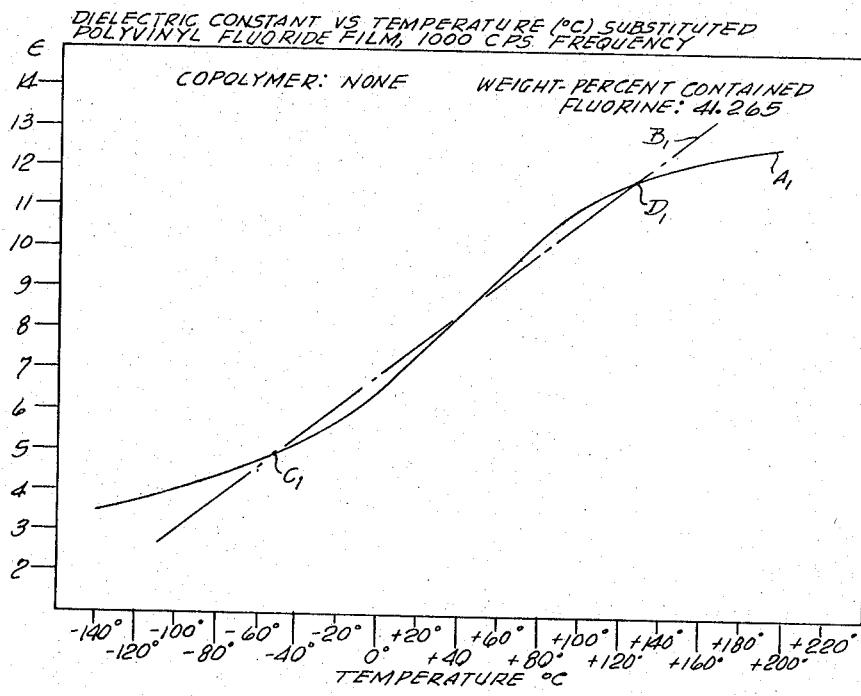

March 28, 1967     M. H. PINTELL     3,311,801
ELECTRIC CAPACITOR
Original Filed July 7, 1965     2 Sheets-Sheet 1

INVENTOR.
MILTON H. PINTELL
BY Karl G. Ross
ATTORNEY

United States Patent Office 3,311,801  
Patented Mar. 28, 1967

3,311,801  
ELECTRIC CAPACITOR  
Milton H. Pintell, Bronx, N.Y., assignor to Intron International, Inc., Congers, N.Y., a corporation of New York  
Continuation of application Ser. No. 470,059, July 7, 1965. This application June 23, 1966, Ser. No. 561,315  
2 Claims. (Cl. 317—258)

This application is a continuation of Ser. No. 470,059 filed July 7, 1965, now abandoned, which application in turn was a continuation-in-part of my now abandoned but formerly copending application Ser. No. 98,357, filed Mar. 27, 1961, divided Aug. 13, 1962, Ser. No. 226,760, now U.S. Patent No. 3,257,607.

It is known that certain solid insulators, particularly thermoplastic films, have a dielectric constant which appreciably varies with temperature so that, theoretically, it is possible to design capacitive circuit elements as temperature-responsive devices adapted to perform a switching operation under predetermined thermal conditions. An advantage of such thermosensitive capacitors over conventional thermistors is that, whereas the latter dissipate electric energy which not only is lost to its intended purpose but also is converted into heat liable to affect the response of the element, the condenser-type temperature detector is substantially nondissipative. This advantage, however, is offset in the case of known dielectrics by the lack of even approximative linearity of their thermal coefficients, at least in those temperature ranges above and below 0° C. which are of particular interest in practice. Moreover, thermistors have approximately semilogarithmic characteristics over the most desirable ranges and are, therefore, unsatisfactory for many applications aside from the self-heating effect.

It is, therefore, the general object of my present invention to provide a thermosensitive capacitor of the character set forth which has a nearly linear characteristic of dielectric constant versus temperature, with a distinct positive slope, in a range from well above room temperature to substantially below freezing.

A more particular object of this invention is to provide a capacitor satisfying the aforestated desiderata throughout a temperature range of, say, $-54°$ C. to $+125°$ C., this being an important performance range in military specifications.

A further object of this invention is to provide a highly flexible dielectric material endowed with the above-mentioned characteristics so that condensers made with such material can readily be wound into rolls or otherwise deformed to suit particular physical or electrical requirements.

Still another object of the instant invention is to provide an improved electrical capacitor and to extend the principles originally advanced in the above-mentioned copending application.

As disclosed in my aforementioned application Ser. No. 98,357, a solid dielectric material of substantially linear characteristic within a range of 0° C. to $+100°$ C. and beyond, i.e., with a substantially fixed thermal coefficient of its dielectric constant (this coefficient being the slope of the characteristic), comprises a film of partially substituted polyvinylfluoride, i.e., a polymer in which only some of the hydrogen atoms of a vinyl chain are replaced by fluorine atoms. The present invention deals more particularly with the production of compounds according to this formula and with specific compounds.

In my concurrently filed copending application Ser. No. 470,058 I disclose a dielectric material in film form which can be considered for practical purposes to be a partially substituted polyvinyl fluoride in the sense that the material is a copolymer of vinyl fluoride and an allyl-vinyl ether so that the vinyl fluoride chain is interrupted by polymer segments which contain no halogen. The allylvinyl ether can be methylvinyl, isobutylvinyl or cetyl-vinyl ether and the proportion of fluorine in the film can range between substantially 30 and 40% by weight. Since commercially available polyvinyl fluoride generally has a fluorine content of slightly above 41% by weight, the copolymer includes between substantially 5 and 25 parts by weight of the allylvinyl ether together with 95 to 75 parts by weight of vinyl fluoride.

It has been found that it is also possible to provide a film of partially substituted polyvinyl fluoride fulfilling the physical and electrical requirements of a dielectric material used for temperature-sensitive electrical capacitors when the commercially available polyvinyl fluoride having a pure characteristic of variation of dielectric constant with temperature, is partially dehalogenated to have a fluorine content ranging between substantially 26% and 38% by weight, the starting material preferably being polyvinyl fluoride with a fluorine content of substantially 41.3% by weight. The dehalogenation process can be any of those suitable for dechlorinating polyvinyl chloride although care must be taken to terminate the dehalogenation step prior to complete removal of fluorine. The product of the fluorination step can be dissolved in a solvent, preferably hot dimethylformamide, and cast into a film with evaporation of the solvent.

The film has excellent physical properties from the point of view of flexibility and elongability, has a substantially linear temperature characteristic of dielectric constant and a relatively high breakdown voltage. The defluorination process appears to create halogen-free portions along the polymer chain which function similarly to the nonhalogenated copolymer chain portions described in the above-mentioned concurrently filed copending application.

Figure 3:
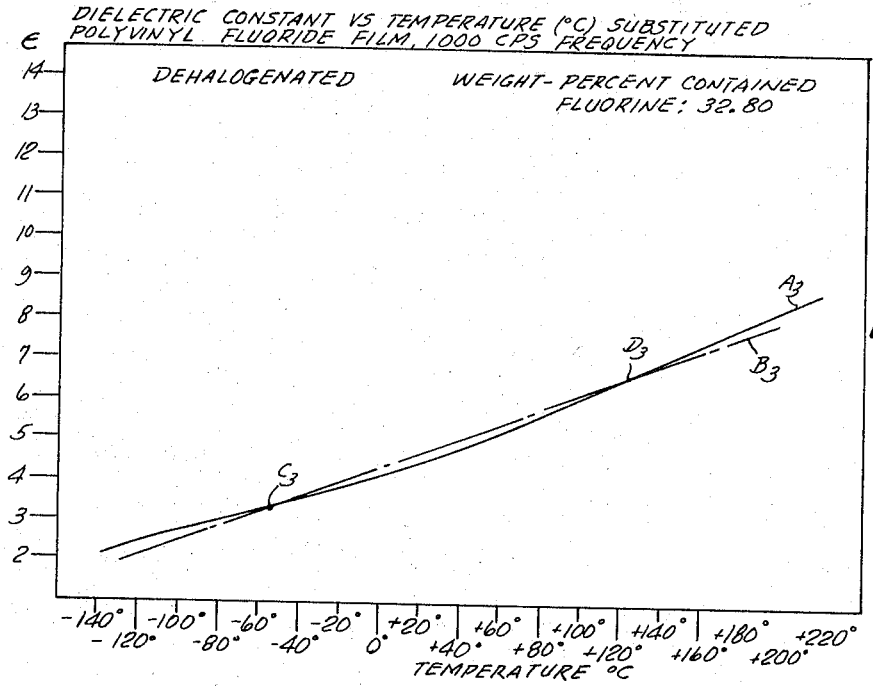
Figure 4:
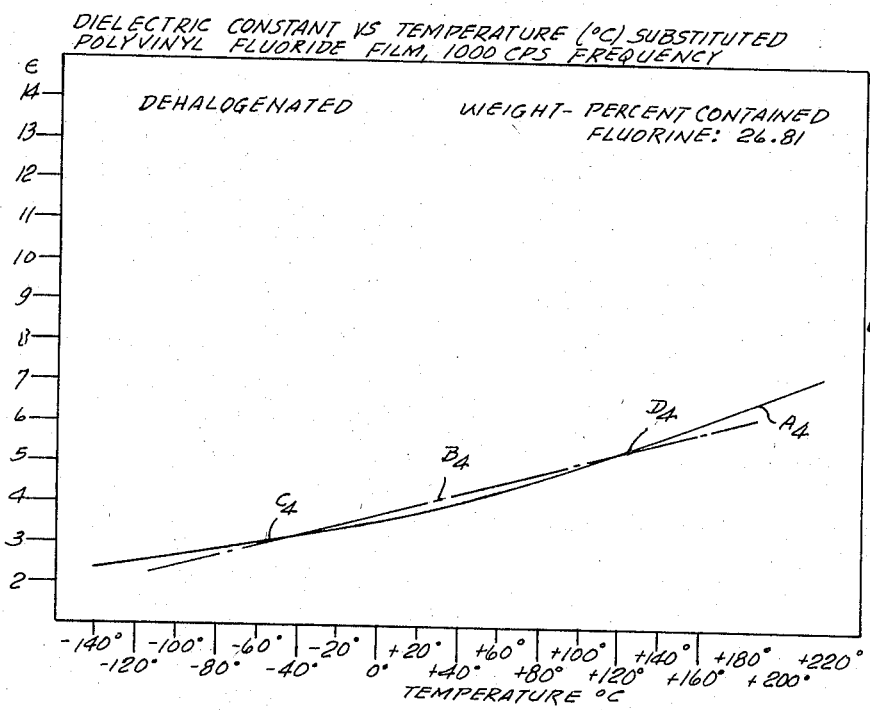
Figure 5:
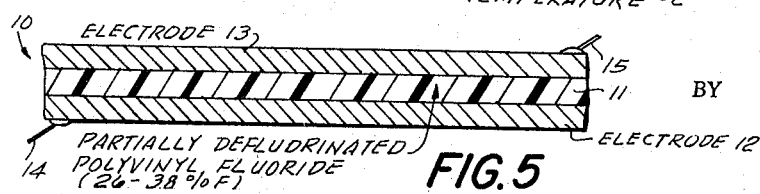

Reference will now be made to the following specific examples and the acompanying drawing wherein  
FIGS. 1–4 are a set of graphs representing the dielectric constants of a variety of polyvinyl fluoride films, plotted as a function of temperature; and  
FIG. 5 is a cross-sectional view through a capacitor according to the present invention.

The characteristic curves of FIGS. 1–4 were all established with a constant test frequency of 1000 cycles per second, in ranges from $-140°$ to $+220°$ C. as indicated along the abscissa. The ordinate represents the dielectric constant $\epsilon$ of the materials involved.

FIG. 1 relates to a standard polyvinylfluoride film (commercially available under the name Teslar) with a fluorine proportion of 41.265% by weight. This noncopolymer film can be prepared as described by Kalb et al. in Journal of Applied Polymer Science, IV, 10, pp. 55–61 (1960). The characteristic $A_1$ of this film is of distinctly nonlinear shape approximating an S-curve, with a steeply sloping portion in the region of $-20°$ to $+100°$ C. and lesser slopes on both sides of that region. A straight line $B_1$ intersects the curve $A_1$ at points $C_1$, $D_1$ corresponding to $-54°$ and $+125°$ C., curve $A_1$ deviating appreciably from line $B_1$ in the range $C_1$–$D_1$ by passing first below and then above that line.

Figure 2:
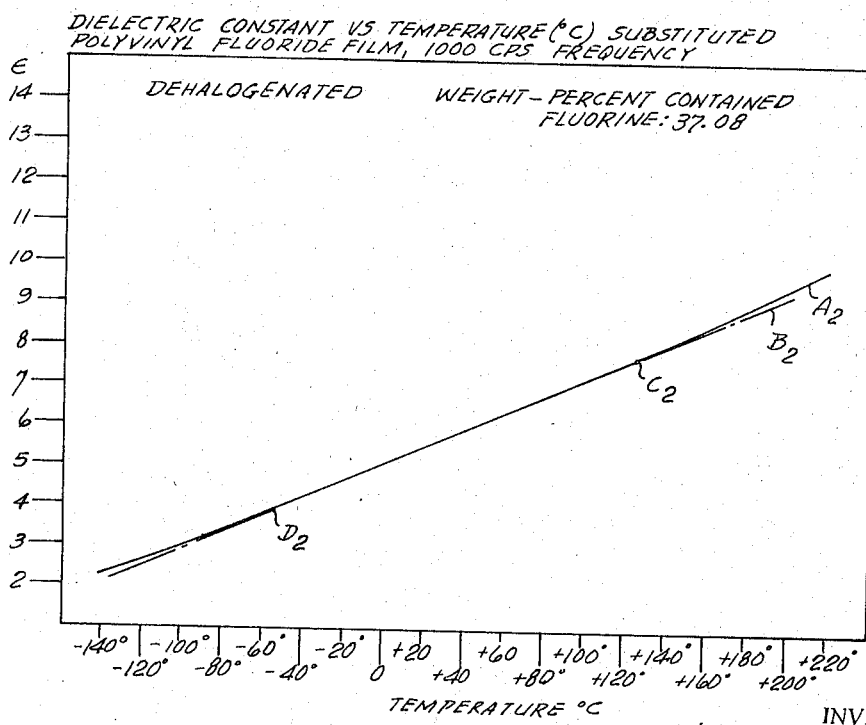

In FIG. 2 I have shown a similar characteristic $A_2$ intersected at points $C_2$ and $D_2$ by a straight line $B_2$ from which it deviates only in one sense throughout the temperature range of principal interest. It will be noted that the slope of curve $A_2$ is more nearly constant than that of curve $A_1$. This curve $A_2$ is the characteristic of a partially dehalogenated polyvinylfluoride, the fluorine proportion being 37.08% by weight. The film is produced as described below.

In FIG. 3 I have shown the characteristic $A_3$ of a partially defluorinated polyvinylfluoride with the fluorine proportion reduced to 32.80% by weight. There is only a minor deviation of curve $A_3$ from straight line $B_3$ between points $C_3$ and $D_3$.

I have shown in FIG. 4 a curve $A_4$ which closely approaches a straight line $B_4$, intersecting it at points $C_4$ and $D_4$, throughout the temperature range of $-54°$ to $+125°$ C.; curve $A_4$ is the characteristic of a partially defluorinated polyvinylfluoride, with the fluorine proportion amounting to 26.81% by weight.

FIG. 5 shows a capacitor 10 comprising a film 11 of partially defluorinated polyvinylfluoride sandwiched between vapor-deposited electrodes 12 and 13 to which terminals 14 and 15 are affixed.

It will be apparent from the graphs of FIGS. 1–4 that the partially defluorinated polyvinylfluorides as a class, are superior as thermosensitive dielectric materials to ordinary polyvinylfluoride film.

The films advantageously have a thickness between substantially $2.5\mu$ and 0.08 mm., with a breakdown voltage ranging approximately from 12,000 to 16,000 volts per millimeter of thickness.

EXAMPLE I

Preparation partially substituted polyvinyl fluoride 300 g. of polyvinylfluoride polymer containing 41.265% fluorine, were dissolved in 3000 g. of hot (120° C.) purified dimethylformamide, in a 4,000 ml. reaction kettle. 75 g. of lithium aluminum hydride were slowly added with mild agitation, and the mixture was then refluxed at the boiling point (153° C.) of dimethylformamide. The reaction proceeded smoothly. After 5 hours refluxing, a sample of the partially dehalogenated polymer was removed and a fluorine determination on the sample was made. The sample contained 37.08% fluorine, indicating a loss of 4.18% fluorine. Under comparable conditions refluxing for 11 hours produced a polymer containing 32.80% fluorine or a loss of 8.46% fluorine. Refluxing for 23 hours produced a polymer containing 26.81% fluorine, or a loss of 14.45% fluorine.

After reaching the desired fluorine content, the partially substituted, dehalogenated polymer solution was slowly poured, with vigorous agitation into 20 liters of hot (95° C.) water. A finely divided, slightly fibrous suspension of polymer formed. The polymer was recovered by filtration and thoroughly washed with high-purity deionized water, until a sample of the wash water gave no indication of a rise in conductivity of the wash water. The washed partially substituted dehalogenated polymer was then dried at 80° C. A white, finely-divided partially fibrous polymer was obtained.

EXAMPLE II

Preparation partially substitued polyvinyl fluoride 300 g. of polyvinylfluoride polymer, containing 41.265% (by weight) fluorine, were dissolved in 3000 g. of hot (120° C.) dimethylformamide in a 4-liter reaction kettle. 300 g. zinc dust, previously purified by treating the dust in dilute hydrochloric acid, washed and dried, was added to the polyvinylfluoride solution. The mixture was slowly stirred and refluxed at the boiling point (153° C.) of the dimethylformamide. After 3 hours and 45 minutes of refluxing, a sample of the dehalogenated polymer was removed and a fluorine determination made. The sample contained 37.08% fluorine, indicating a loss of 4.18% fluorine. Under comparable conditions, refluxing for 6 hours produced a polymer containing 32.64% fluorine, or a loss of 8.62% fluorine. Refluxing for a total of 15 hours produced a polymer containing 26.72% fluorine or a loss of 14.54% fluorine.

The hot solution was filtered to remove the unreacted zinc dust and the partially substituted polymer solution was slowly poured with vigorous agitation into 20 liters of hot (95° C.) water. A finely divided, slightly fibrous suspension of the polymer was formed, which was recovered by filtration, and thoroughly washed with high-purity deionized water, until a sample of the wash water gave no indication of an increase in conductivity. The washed partially substituted polymer was dried at 80° C. A white, finely divided, slightly fibrous polymer was obtained.

EXAMPLE III

Preparation of films of partially substituted polyvinyl fluoride 500 g. of partially substituted polyvinyl fluoride, produced in accordance with Examples I and II, were dissolved, with stirring into 5000 g. of hot (120° C.) dimethylformamide. The solution was filtered through a fibrous glass mat, and continuously cast onto a highly polished chromium-plated steel drum 42 inches in diameter. The dimethylformamide was evaporated from the wet cast film, and the cast dry film was continuously stripped from the drum surface, and rewound. Films ranging from $2.5\mu$ through $12.5\mu$ thickness were produced. These films were slit to the desired widths, and employed to produce the thermally sensitive capacitor described.

I claim:

1. A thermally sensitive electrical capacitor comprising a pair of electrodes separated by a film of partially defluorinated polyvinyl fluoride with a fluorine content of 26 to 38% by weight of the polymer, said polymer being composed exclusively of carbon, hydrogen and fluorine atoms.

2. An electrical component with a progressively varying impedance in a temperature range of a substantially $-54°$ C. to $+125°$ C. comprising a capacitor with a substantially linear capacitance/temperature characteristic throughout said range, said capacitor including a pair of electrodes separated by a film of partially defluorinated polyvinyl fluoride with a fluorine content of 26 to 38% by weight of the polymer, said polymer being composed exclusively of carbon, hydrogen and fluorine atoms.

References Cited by the Examiner

UNITED STATES PATENTS 2,419,010    4/1947    Coffman.

LEWIS H. MYERS, *Primary Examiner.*

E. GOLDBERG, *Assistant Examiner.*